C. J. LANE.
FARM GATE.
APPLICATION FILED OCT. 25, 1911.
1,035,978.
Patented Aug. 20, 1912.
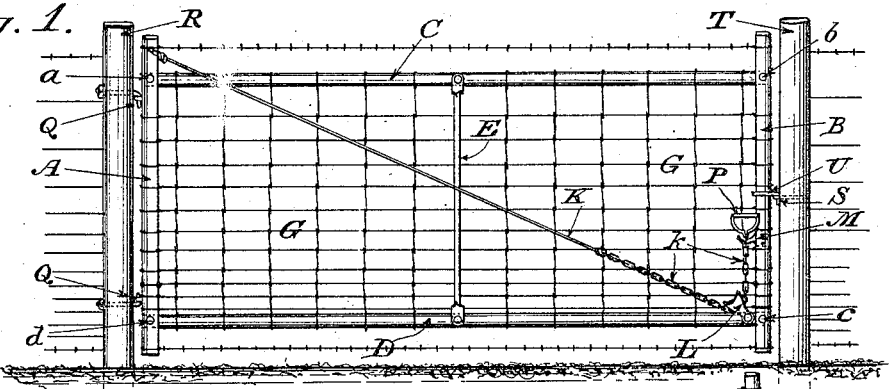
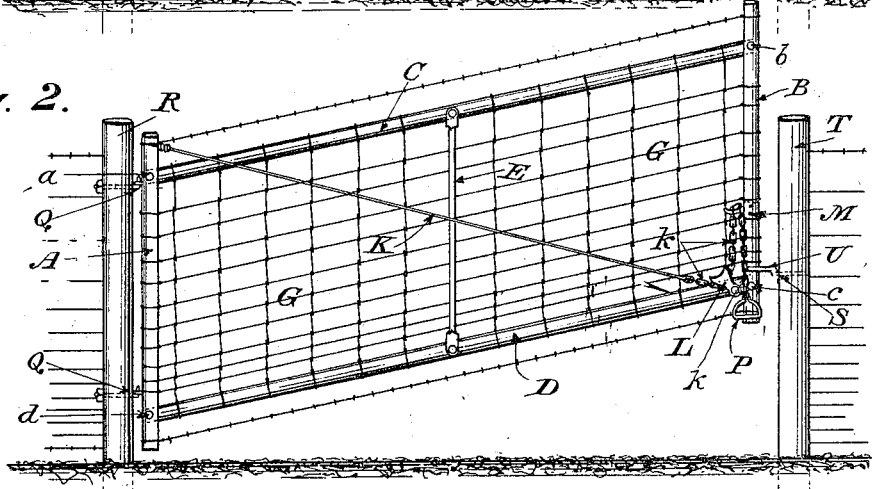
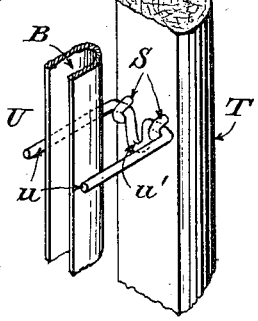
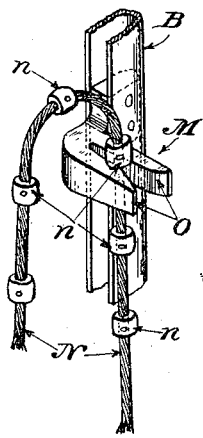
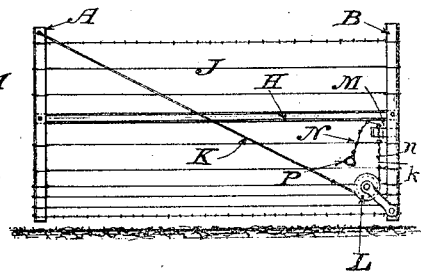
WITNESSES:
N. L. Brennan
H. P. Sullivan
INVENTOR:
Cornelius J. Lane
by his attorneys,
Thurston & Kwis

UNITED STATES PATENT OFFICE.

CORNELIUS J. LANE, OF CLEVELAND, OHIO, ASSIGNOR TO THE CYCLONE WOVEN WIRE FENCE COMPANY, OF CLEVELAND, OHIO, A CORPORATION OF OHIO.

FARM-GATE.

1,035,978.      Specification of Letters Patent.      Patented Aug. 20, 1912.

Application filed October 25, 1911. Serial No. 656,703.

*To all whom it may concern:*

Be it known that I, CORNELIUS J. LANE, a citizen of the United States, residing at Cleveland, in the county of Cuyahoga and State of Ohio, have invented a certain new and useful Improvement in Farm-Gates, of which the following is a full, clear, and exact description.

This invention relates to a farm gate, so constructed that its free end may be raised to any desired height above its hinged end to form an opening beneath the free end that will permit of the passage of smaller animals and fowls while obstructing the way for those of larger sizes.

It consists of a gate frame composed of rigid vertical end members to which are flexibly connected at their intersecting points one or more rigid longitudinal or horizontal members by suitable pivot pins having their axes disposed transversely to the flat plane of the gate so that the frame will flex on these pivot joints when its free or swinging end is being raised or lowered. The space between the end members may be filled by longitudinal wires flexibly connected to the end members or by flexible woven wire fabric flexibly connected to the rigid bars of the gate frame in such manner as to admit of the free movements of the fabric strands in correspondence with the members of the gate frame.

It further consists in the application to the described pivotally jointed gate frame of a tension-truss member secured at one end to the upper portion of the hinged end of the gate and extending thence diagonally downward to and around a suitable guide near the lower portion of the free or swinging end of the gate, thence upwardly to adjustable engagement with a suitable holding device supported on the gate above said guide.

The invention further consists in such minor contributory details of construction as will hereinafter be described and specifically set forth in the appended claims.

In the accompanying drawing Figure 1 is a side elevation of a gate embodying in preferred form the features of this invention, the gate being shown in normal closed position. Fig. 2 is a similar view of the gate in position with its free end slightly raised above its normal position above the ground to admit of the passage beneath it of the smaller sizes of farm animal stock. Fig. 3 is an enlarged perspective view of a preferred form of catch or latch adapted to hold the gate from swinging while admitting of the raising of its free end. Fig. 4 shows one of the many modified forms of catch or holder for the free end of the adjustable flexible tension truss. Fig. 5 shows some modifications in the details of construction of the gate frame.

In its preferred form, as shown in Figs. 1 and 2 of the drawing, the gate frame consists of rigid vertical end posts or bars A and B, between which extend rigid top and bottom longitudinal bars C and D pivotally connected at their intersections to the end bars as at $a$, $b$, $c$ and $d$. A rigid vertical brace bar E pivotally connected to the longitudinal bars C and D may also be employed if desired. In this preferred form the four rigid frame bars A, B, C and D constitute a rectangular outer frame, the space within which may be filled with woven wire fabric G flexibly jointed at the intersection of the wires and flexibly connected to the frame bars.

Some of the many modifications in the gate construction are shown in Fig. 5 in which a single longitudinal bar H extends as a strut brace between the end bars A, B, to the central portions of which its ends are pivotally connected. Instead of the flexible woven wire fabric G the space between the end bars is filled with straight wires J, barbed or otherwise as desired, these wires being flexibly connected at their ends to the end bars A, B, and, being under tension, act in opposition to the strut member to form a rigid gate frame.

The really essential feature of the gate frame lies in its pivotal joints or flexible connections that admit of its free end being raised and lowered while the hinge bar remains stationary in this respect.

A tension truss K is secured at one end to the hinge side of the gate and extends thence diagonally downward to and around a suitable curved clevis guide or sheave L secured upon the gate near its free end and in a lower plane than the fixed end of the truss. This truss rod may be flexible throughout its entire length, if desired, but its free end $k$ must be flexible to pass around the guide L. Secured on the gate above the guide is a suitable holding device M adapted to engage and hold, in any adjusted position, the free end of the tension truss which extends upwardly to it from the guide L. If this free end of the truss is composed of chain a projecting hook adapted to pass through one of the open links would form a good holding device, or a pair of prongs spaced sufficiently to receive one of the links flatwise between them would also answer the purpose very well. If, on the other hand, wire cable N (see Fig. 4) were used for this flexible end of the truss, a pair of slightly diverging prongs O would doubtless hold the cable if it were tightly jammed into the gap, or the cable might be provided with a series of fixed knots, balls or other suitable enlargements $n$ that would not pass through the gap and would obviate the necessity for pressing the cable into frictional engagement with the sides of the gap.

The tension truss may, if desired, be provided with a grip or handle P as shown in Figs. 1 and 2. But the particular forms of these and other such contributory details are not considered as specially essential to the invention.

At the hinge end of the gate any preferred form of hinges Q may be employed to swing the gate on the rigid post R. At the free end of the gate the bar B is preferably engaged by a U-shaped latch U shown in Fig. 3 to hold the gate from swinging. The closed end of the U is hung in staples S driven into the fence post T, preferably on a flattened surface thereof, while its prongs $u$ stand out into the path of the bar B embracing it at each side. These prongs are made long enough to provide for the slight shortening of the gate when it is raised above its normal position.

In adjusting the free end of the gate to different heights the length of the diagonal portion of the tension truss is changed and the operation may be effected by one hand only of the operator. In raising the end of the gate he pulls upwardly on the free flexible end of the truss in the same direction as the desired movement of the gate end so that the lifting force is most advantageously applied both to lift the gate and to shorten the diagonal portion of the truss, making the operation of adjusting the position of the gate so very easy and simple that it may be readily performed, even in the dark, by anyone possessing ordinary intelligence. Another advantage of an end-lift gate lies in the fact that when sufficiently raised it admits of the passage under it of wind-blown snow which will frequently start to bank against the lower strands of a wire fence and form the nucleus of deep drifts. With a gate end raised to give sufficient clearance above the ground the drifting snow which would otherwise bank against the lower strands is blown through the gateway and the passage thus kept cleared.

While the truss rod is shown conventionally in the drawing as extending from the top corner at the hinged end to the lower corner at the free end of the gate frame, an advantageous disposition for its function as a diagonal truss, it is not essential to the invention that the truss be extended between such extreme points either as to height or length along the gate frame. That is to say, that so long as it is given a sufficient working diagonal angle, the ends of the truss may be secured to the rigid frame-members at any desired elevations and to suitable points at or near the respective ends of the gate.

Having thus described the invention what is claimed as new and useful therein is:

1. In combination, a gate frame having vertical end posts with longitudinal members flexibly connected thereto whereby the free end of the gate may be raised above its hinged end, a guide secured on the frame near the free end of the gate, a tension truss secured at one end to the frame near the hinged end of the gate and extending thence diagonally downward to and around said guide from whence its flexible free end extends vertically, whereby lifting power applied to said free end of the truss above said guide tends to raise the free end of the gate and to shorten the diagonal portion of the truss.

2. In combination, a gate frame having vertical end posts with longitudinal members flexibly connected thereto whereby the free end of the gate may be raised above its hinged end, a guide secured on the frame near the free end of the gate, a tension truss secured at one end to the frame near the hinged end of the gate and extending thence diagonally downward to and around said guide from whence its flexible free end extends vertically, with suitable securing means on the gate above said guide to hold the adjustable free end of the truss.

In testimony whereof, I hereunto affix my signature in the presence of two witnesses.

CORNELIUS J. LANE.

Witnesses:
WM. A. SKINKLE,
H. R. SULLIVAN.